Jan. 13, 1942.     E. H. SCHWARTZ     2,269,488
AUTOMATIC SAFETY SHUTTER
Filed Jan. 19, 1940
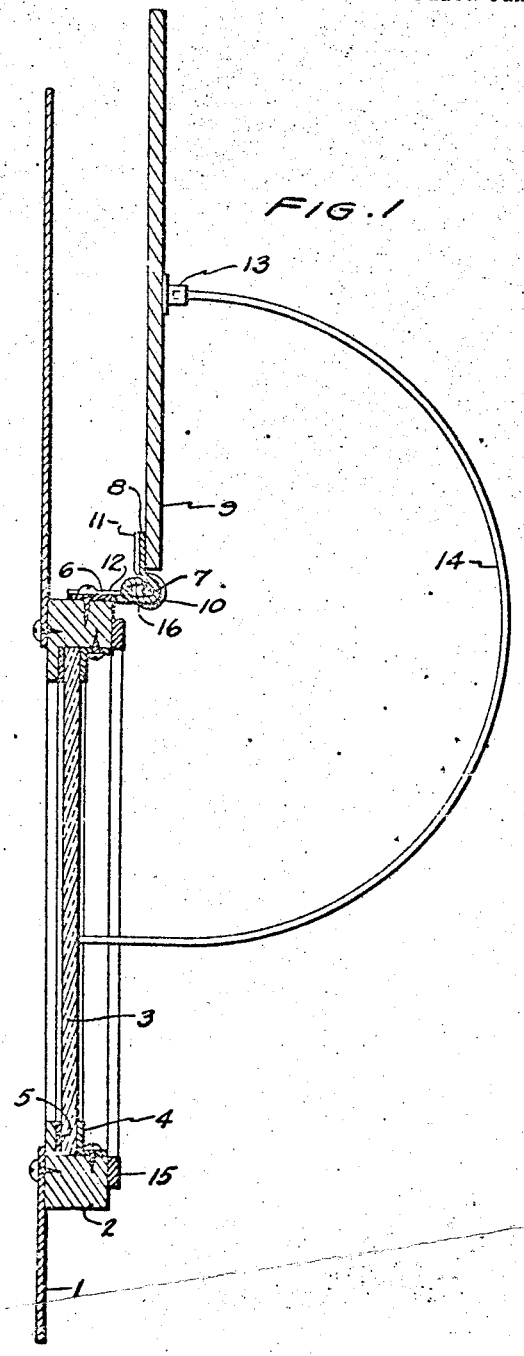
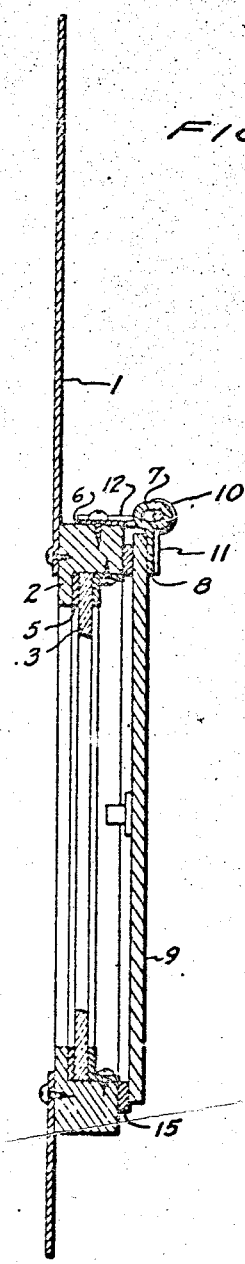
INVENTOR
EDWARD H. SCHWARTZ Patented Jan. 13, 1942

UNITED STATES PATENT OFFICE 2,269,488

AUTOMATIC SAFETY SHUTTER

Edward H. Schwartz, Dayton, Ohio

Application January 19, 1940, Serial No. 314,658

5 Claims. (Cl. 20—40)

(Granted under the act of March 3, 1883, as amended April 30, 1928; 370 O. G. 757)

The invention described herein may be manufactured and used by or for the Government for governmental purposes, without the payment to me of any royalty thereon.

This device relates to a sealing shutter for use in connection with a sealed window in high-altitude aircraft equipped with apparatus for maintaining the air in the cabin of the aircraft at approximately atmospheric pressure.

It is an object of this invention to provide in connection with a sealed opening in an inclosure, the interior of which is maintained at a predetermined pressure, an auxiliary sealing means automatically operable upon failure of the primary sealing means.

It is another object of this invention to provide in connection with a pressure-tight compartment having an opening therein and a window for sealingly closing the opening, a shutter normally held in an inoperative position but automatically movable, upon breakage of the window, into opening sealing position.

It is more particularly an object of this invention to provide in connection with a sealed window in aircraft, the interior of which is maintained at a predetermined pressure, an auxiliary sealing member automatically operable, upon breakage of the window, to seal the window opening.

In the drawing:

Fig. 1 is a vertical sectional view through the inclosure structure, the window, and the shutter, with the shutter in open position; and Fig. 2 is a view similar to Fig. 1, with the shutter in closed operative position.

Referring to the drawing:

1 is a part of an inclosure structure, such as cabin inclosure means, for covering an airplane equipped for traveling in regions of rarefied atmosphere by having associated therewith suitable mechanism (not shown) for maintaining the air in the cabin at a predetermined pressure approximating normal atmospheric conditions. Suitably connected to the inclosure or cabin structure is a window frame 2 for supporting window glass 3. Angle member 4 holds the glass in position in the frame against sealing member 5. Suitably connected to the window frame is a bracket member 6 having integral therewith a shaft 7 upon which is pivotally mounted a hanger 8, carrying shutter 9. The hanger 8 is provided with an enlarged shaft engaging bearing portion 16, permitting longitudinal sliding movement of the shutter with respect to the window. Torsion spring 10, having an extending portion 11 bearing against hanger 8, and a second extending portion 12 bearing against bracket 6, urges shutter 9 in a clockwise direction into closed position. The shutter is provided with a socket member 13 for receiving one end of rod 14, the other end of which rests against the window glass 3 for the purpose of holding the shutter in open inoperative position. Upon breakage of the window glass, shutter 9 moves under the action of spring 10 to closed position against sealing member 15. Sealing member 15 also serves as a buffer. The difference in pressure between the inside and the outside of the cabin maintains the shutter in closed sealing position against member 15. Enlarged bearing portion 16 permits relative sliding movement between the shutter and the sealing member, insuring a uniformly tight seal.

It is obvious that various changes may be made in the device without departing from the spirit of the invention, it being intended to be limited only by the appended claims.

I claim:

1. A sealing shutter for use in connection with a window in a structure, the atmosphere of which is maintained at a predetermined pressure, comprising means for attaching said shutter to said structure, means for urging said shutter into a closed position, and means carried by said shutter and engaging the transparent portion of said window to hold said shutter in open position, whereby, upon breakage of the transparent portion of said window, said auxiliary window is moved into closed position.

2. A shutter for use in connection with a sealed window of a vehicle cabin, the interior atmosphere of which is maintained at a predetermined pressure, comprising means for attaching said shutter to said cabin, means for urging said shutter into window closing position, and means carried by said shutter and engaging a transparent portion of said window for holding said shutter in an open position, whereby, upon breakage of said transparent portion, said closing means urges said shutter into closed sealed position.

3. In a structure, the interior of which is maintained at a higher pressure than the exterior thereof, window means sealed in said structure, shutter means mounted upon the interior of said structure, means carried by one of said means and engaging the other of said means for holding said shutter means in an inoperative position, and means responsive to breakage of said window for moving said shutter into window-sealing position.

4. In a substantially pressure-tight inclosure structure having an opening therein, a window sealing said opening, a shutter pivotally mounted on said structure adjacent said opening, and means engaging both said window and shutter and directly responsive to breakage of said window for moving said shutter into opening sealing position.

5. In a substantially pressure-tight inclosure member having an opening therein, a window sealing said opening; a shutter; bearing means for pivotally mounting said shutter adjacent said opening and upon the higher pressure side of said member, said bearing means comprising a hanger and a loosely fitting bearing pin; and means directly responsive to breakage of said window for moving said shutter into opening sealing position, the difference in pressure between the two sides of said member serving to maintain said shutter in closed sealed position.

EDWARD H. SCHWARTZ.